May 4, 1937. A. L. LANGEL 2,079,456
BAKING PAN
Filed Feb. 12, 1936 3 Sheets-Sheet 2
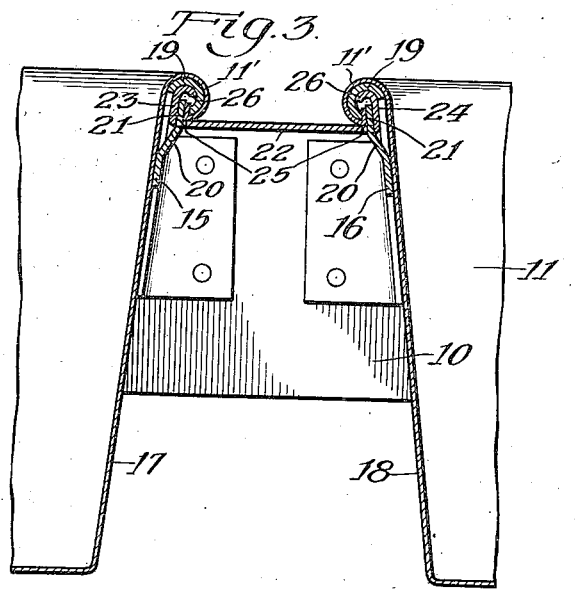
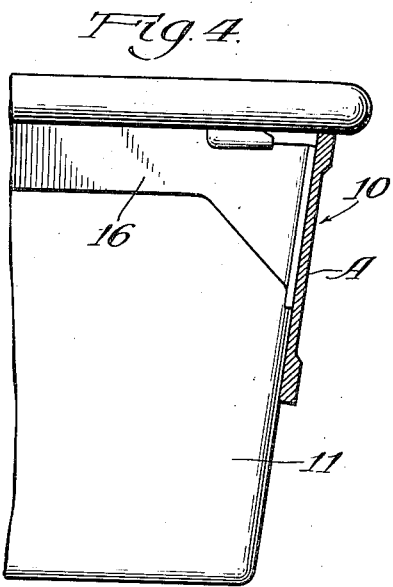
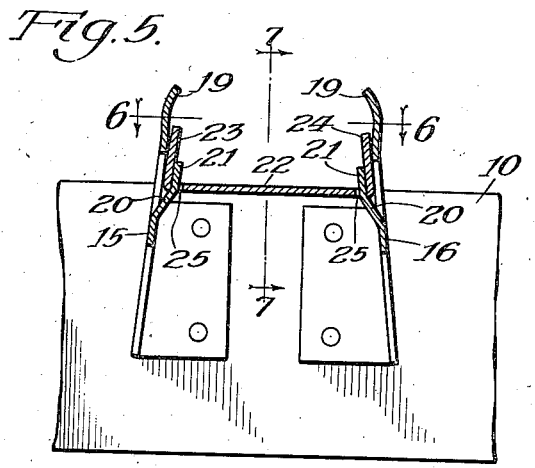
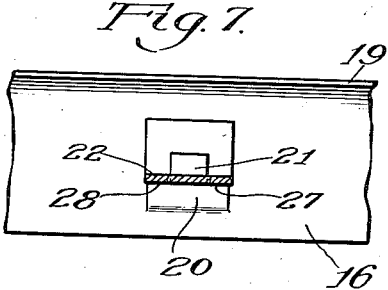
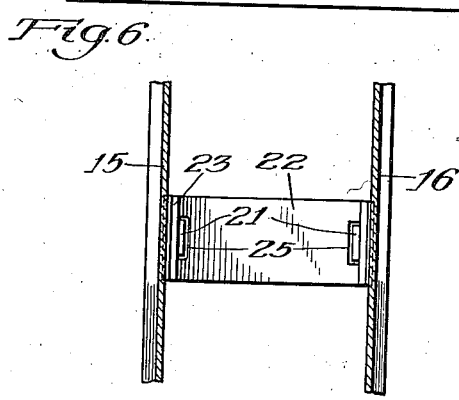
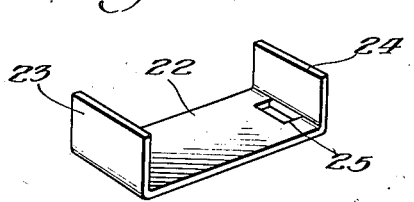
Inventor:
Adrien L. Langel,
By: Zabel, Carlson & Wells,
Attorneys May 4, 1937.　　　　A. L. LANGEL　　　　2,079,456
BAKING PAN
Filed Feb. 12, 1936　　　　3 Sheets-Sheet 3

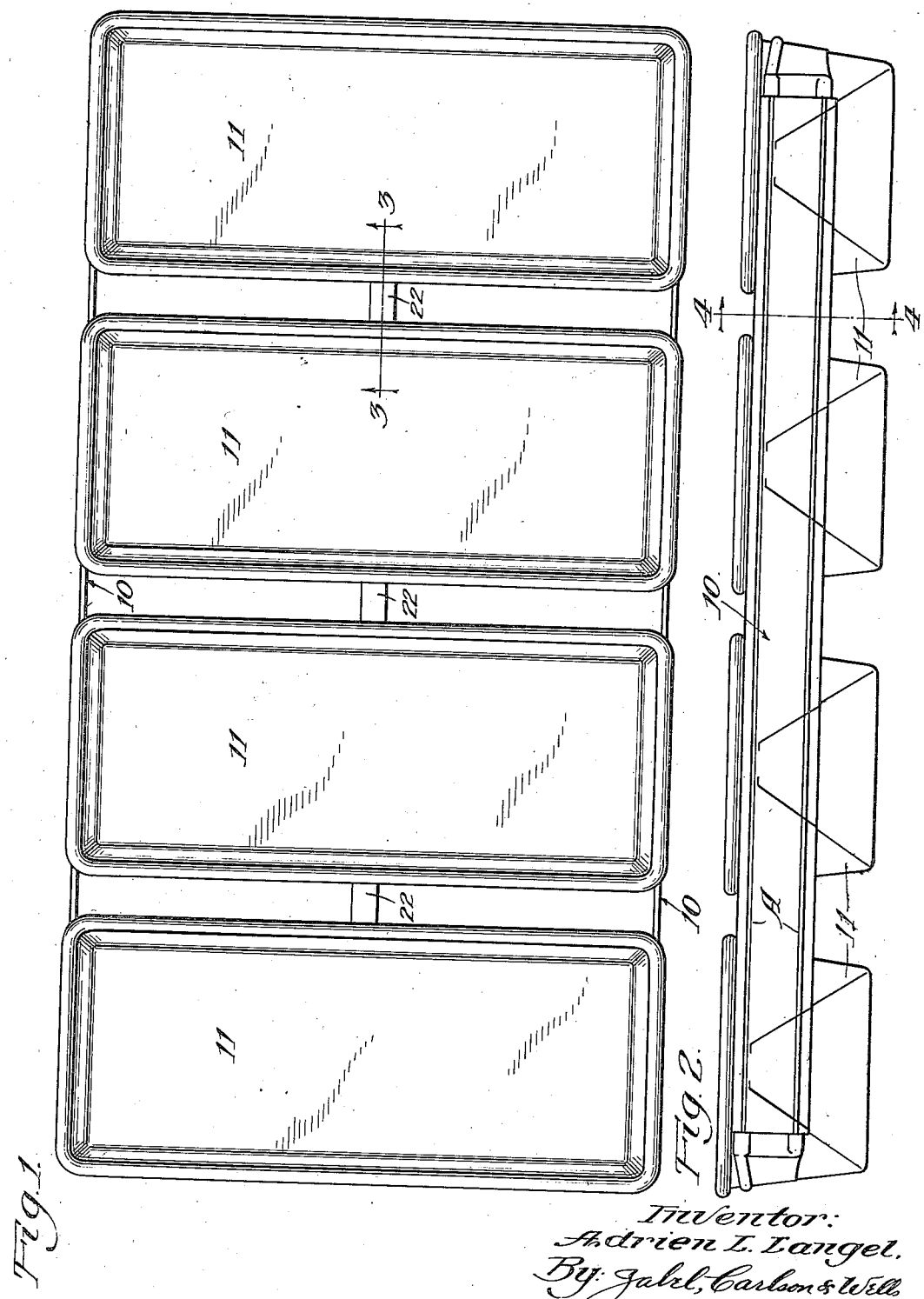

Inventor:
Adrien L. Langel,
By Zabel, Carlson & Wells
Attorneys.

Patented May 4, 1937

2,079,456

UNITED STATES PATENT OFFICE 2,079,456

BAKING PAN

Adrien L. Langel, Chicago, Ill., assignor to Chicago Metallic Manufacturing Company, Chicago, Ill., a corporation of Illinois Application February 12, 1936, Serial No. 63,571

7 Claims. (Cl. 53—6)

This invention relates to baking pans of the multiple type such as is used by commercial bakers. The present improvements are directed to the means by which a plurality of pans are joined together in spaced relation within a frame, the principal novelty being in the structure which supports and spaces the pans within the frame.

In multiple pan constructions of the type above referred to, the pans are spaced apart longitudinally of the frame and are supported by braces which extend transversely of the frame and are connected at their opposite ends to the side portions of the frame. These braces are united with the top edges of the pans by curling over the top edges of the pans and the upper portions of the braces to provide a bead. Means are provided to properly space and secure the adjacent braces and pans to each other at one or more points between the sides of the frame. The present invention contemplates the provision of suitable binders in the nature of strips or plates which are interlocked with the braces in such fashion as to prevent their becoming loose in the handling of the pans. The interlocking feature of the binders also insures the proper spacing prior to the application of a pan thereto.

The purposes and advantages of the invention will be more clearly apparent as the description proceeds in connection with the accompanying drawings, wherein a preferred embodiment of the invention is shown.

In the drawings, Fig. 1 is a plan view of a multiple pan embodying the invention.

Fig. 2 is a view in side elevation of the pan.

Fig. 3 is a sectional view taken on the line 3—3 of Fig. 1.

Fig. 4 is a sectional view taken on the line 4—4 of Fig. 2.

Fig. 5 is a sectional view similar to Fig. 3 showing the relation of parts prior to the operation of securing the pans to the frame.

Fig. 6 is a fragmentary plan view of the structure shown in Fig. 5.

Fig. 7 is a sectional view on the line 7—7 of Fig. 5.

Fig. 8 is a perspective view of a binder used in the construction.

Figure 9:
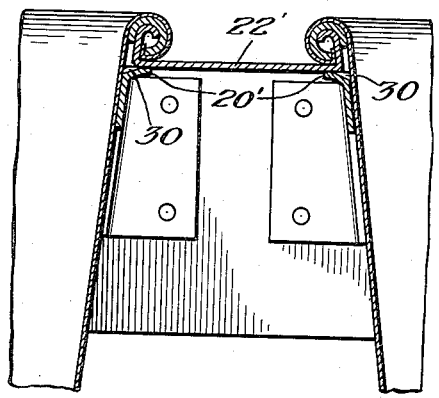
Fig. 9 is a sectional view like Fig. 3 of a modified form of the invention.

Referring now to the drawings wherein a preferred embodiment of the invention is shown, the numeral 10 designates a frame by means of which a plurality of pans 11 are supported in spaced relation to each other. The frame 10 preferably comprises what is termed a band iron extending completely around the several pans.

The sides of the frame 10, as shown in cross-section in Fig. 4, have a recess A in the center of the band iron. Formerly, these sides were made relatively narrow and the pans, when stacked or nested together, had a tendency to stick too tightly. The width of the sides has been increased somewhat to overcome this tendency. In order to keep the weight down, the strips for the sides are rolled with a recessed portion.

Between each pair of pans 11, a pair of cross braces 15 and 16 are provided, these cross braces being secured in any suitable manner such as riveting or welding to the side portions of the frame 10. The cross braces 15 and 16 taper outwardly from each other toward the bottom so as to conform to the taper of side portions 17 and 18 of adjacent pans 11. Each cross brace has an upwardly extending portion 19 which is curved toward the adjacent cross brace before assembling the pans therewith and is adapted to be curled inside the top edge of the pan in the final act of assembling the pans in the frame.

Adjacent the center of the cross brace, each cross brace has struck out therefrom a section 20, which section 20 has a reduced upturned tongue 21 thereon. One or more binder strips or plates 22 may be utilized for securing the adjacent cross braces and the pans together at one or more points between the sides of the frame 10. This binder has upwardly extending end portions 23 and 24 and adjacent each end portion it is provided with an opening 25. In assembling the binders with the frame before securing the pans in position thereon, the binders are seated on a pair of shoulders 27 and 28 (see Fig. 7) provided on each of the sections 20 with the tongues 21 projecting up through the openings 25. In the final operation, the top edges 11' of the pans and the curved portions 19 at the tops of the cross braces are curled together about the portions 23 and 24 of the binders, as shown in Fig. 3, so as to firmly secure the binder to the cross braces and the pans. Preferably, the upper edges of the portions 23 and 24 are curled over as indicated at 26 in Fig. 3 in this final operation. The tongues 21 are held inside the bead formed by the curled over portions at the top of the pan. The edges 11' of the pans are directly against the tongues 21. Thus the binders 22 are supported from below by the shoulders 27 and 28 on the members 20 and the binders are locked in place by the curled over portions 11' and 19.

Figure 10:
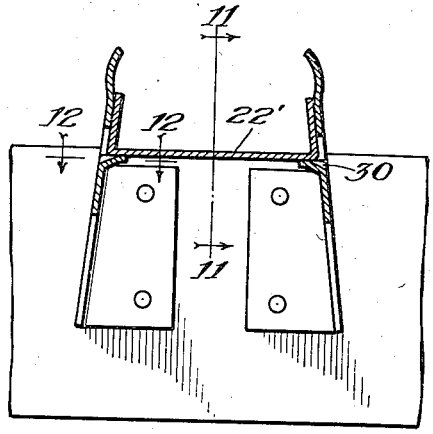
Fig. 10 is a sectional view showing the relation of parts before the pans are secured thereto.
Figure 12:
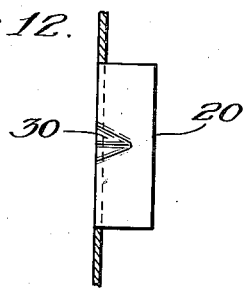
Fig. 12 is a fragmentary sectional view on line 12—2 of Fig. 10.
Figure 11:
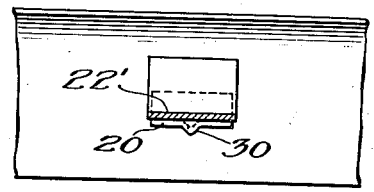
Fig. 11 is a fragmentary sectional view on line 11—11 of Fig. 10.

In the form of the invention shown in Figs. 9 to 11, inclusive, the means for supporting binders 22' consists of a pair of shelves or sections 20' struck out from the cross braces. In this form, however, there are no tongues on the sections 20' passing up through openings in the binders 22'. The binders are merely placed upon the shelves 20' and their end portions curled within the top portions of the cross braces and the pans. In this case, the interlock is obtained by providing the sections 20' for supporting the binders from below and using the tops of the braces to hold the tops of the binders. In order to stiffen or strengthen the sections 20', the metal is formed with depressions 30 intermediate the ends of the sections 20' so as to provide a re-enforcing rib from beneath the sections.

Figure 13:
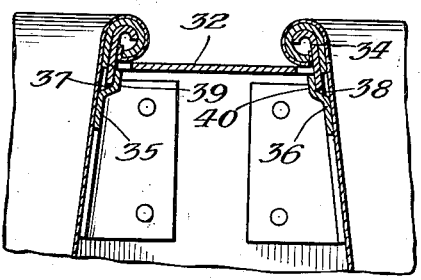
Fig. 13 is a sectional view of a further modification.
Figure 14:
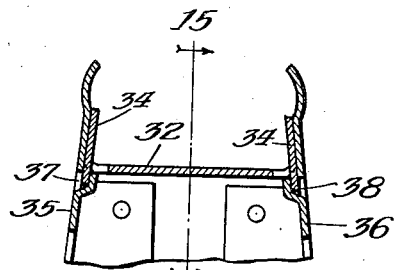
Fig. 14 is a sectional view showing the relation of the parts shown in Fig. 13 before the pans are secured thereto.
Figure 15:
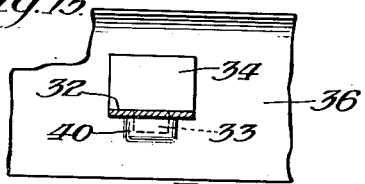
Fig. 15 is a fragmentary sectional view on line 15—15 of Fig. 14.
Figure 16:
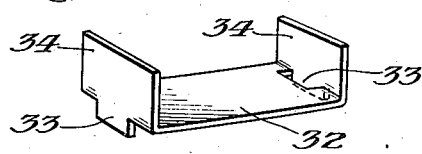
Fig. 16 is a perspective view of a binder used in the form shown in Fig. 13.

In the form of the invention shown in Fig. 13, a binder 32 of different characteristics than the other binders hereinbefore described is utilized. In this binder, a portion 33 of the material is cut out so that, when an end portion 34 of the binder is bent up as shown in Fig. 16, the portion 33 will project downwardly as a tongue. Cross braces 35 and 36 are provided with sockets at 37 and 38 which are formed by striking up a pair of sections 39 and 40. The tongues 33 on the binders 32 seat in the sockets 37 and 38, and the upturned portions 34 of the binder 32 are secured by curled over portions of the pan and the cross braces in the same manner as they are secured in the form shown in Fig. 9.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. A multiple baking pan comprising a plurality of pans arranged side by side in a row, a band frame around the pans, pairs of braces connecting the sides of the frame between the pans and serving to space the pans apart in said frame, and binders connecting the braces and pans together between the ends of the pans, said binders comprising strips having a tongue and slot connection with the braces, and said pans being curled over the free ends of said binders thereby locking the parts together.

2. A multiple baking pan comprising a plurality of pans arranged side by side in a row, a band frame around the pans, pairs of braces connecting the sides of the frame between the pans and serving to space the pans apart and binders connecting the braces and pans together between the ends of the pans, said binders comprising strips having a tongue and slot connection with the braces, and said pans being curled over the free ends of said binders thereby locking the parts together, said braces having the upper portions thereof interposed between the ends of the binders and the curled over portions of said pans.

3. A multiple baking pan comprising a plurality of pans arranged side by side in a row, a band frame around the pans, pairs of braces connecting the sides of the frame between the pans and serving to space the pans apart and binders connecting the braces and pans together between the ends of the pans, said binders comprising strips having a tongue and slot connection with the braces, and said pans being curled over the free ends of said binders thereby locking the parts together, said braces having the upper portions thereof interposed between the ends of the binders and the curled over portions of said pans, said upper portions being curled around the ends of the binders.

4. A multiple baking pan comprising a plurality of pans arranged side by side in a row, a band frame around the pans, pairs of braces connecting the sides of the frame between the pans and serving to space the pans apart and binders connecting the braces and pans together between the ends of the pans, said binders comprising strips having a tongue and slot connection with the braces, and said pans being curled over the free ends of said binders thereby locking the parts together, said tongue and slot connections comprising sections struck out from adjacent braces and having upturned tongues, said binders having openings adjacent to opposite ends thereof receiving said tongues, whereby to position said binders and said braces for attachment to the pans.

5. A multiple baking pan comprising a plurality of pans arranged side by side in a row, a band frame around the pans, pairs of braces connecting the sides of the frame between the pans and serving to space the pans apart in said frame, and binders connecting the braces and pans together between the ends of the pans, said binders comprising strips having upturned ends, said braces having means beneath the ends of said binders to support them, and the upturned ends being secured in beads formed on the top edges of the pans.

6. A multiple baking pan comprising a plurality of pans arranged side by side in a row, a band frame around the pans, pairs of braces connecting the sides of the frame between the pans and serving to space the pans apart, in said frame, and binders extending transversely between the braces of each pair and connecting the braces and pans together between the ends of the pans, said binders comprising strips having upwardly and downwardly extending projections at the ends thereof, said braces having portions receiving said projections to interlock the binders with the braces.

7. A multiple baking pan comprising a plurality of pans arranged side by side in a row, a band frame around the pans, pairs of braces connecting the sides of the frame between the pans and serving to space the pans apart in said frame, and binders extending transversely between the braces of each pair and connecting the braces and pans together between the ends of the pans, said binders comprising strips having end portions supported by said braces and interlocked therewith.

ADRIEN L. LANGEL.